United States Patent [19]

Straub

[11] 3,963,647

[45] June 15, 1976

[54] ELECTROSTATICALLY PAINTABLE INJECTION MOLDABLE BLEND OF PROPYLENE POLYMER, ETHYLENE/HIGHER α-OLEFIN COPOLYMER RUBBER AND CARBON BLACK

[75] Inventor: Robert Michael Straub, Wilmington, Del.

[73] Assignee: E. I. Du Pont de Memours and Company, Wilmington, Del.

[22] Filed: Aug. 22, 1974

[21] Appl. No.: 499,555

[52] U.S. Cl. ............................ 252/511; 260/42.46; 427/30
[51] Int. Cl.² ...................... C08K 3/04; H01B 1/04
[58] Field of Search ................ 260/42.46; 252/511

[56] References Cited
UNITED STATES PATENTS

| | | | |
|---|---|---|---|
| 2,997,451 | 8/1961 | Miller | 260/42.46 |
| 3,379,673 | 4/1968 | Rossman et al. | 260/42.46 |
| 3,402,140 | 9/1968 | Bickel | 260/42.46 |
| 3,700,614 | 10/1972 | Schenkerberg | 260/42.46 |

*Primary Examiner*—James H. Derrington

[57] ABSTRACT

An injection moldable, electrostatically paintable polyolefin composition comprising 100 parts of an ethylene/higher α-olefin copolymer rubber, 20–100 parts of a crystalline propylene polymer, and carbon black, said carbon black having a mean particle diameter of from about 15–30 millimicrons, an oil absorption number (A) having a minimum value of about 40 cc/100 g. and a maximum value wherein A is calculated from the formula $A = 0.3116D^2 - 18.708D + 359.67$, wherein D is the mean particle diameter, with the proviso that the maximum value of A is never greater than 130 cc/100 g., said carbon black present within a range determined by the following formulas:

Minimum parts carbon black = $2.157D - 0.0145D^2 - 0.00467AD - 5.03$;

Maximum parts carbon black = $0.863D - 0.0050D^2 - 0.00625AD - 0.3663A + 0.00159A^2 + 49.19$;

wherein A and D have the values given hereinabove and parts carbon black is based upon the total weight of polymers. The elastomeric composition is used for injection molding large thin sheets for use, for example, as sight shields on the exterior of automotive vehicles.

11 Claims, No Drawings

ELECTROSTATICALLY PAINTABLE INJECTION MOLDABLE BLEND OF PROPYLENE POLYMER, ETHYLENE/HIGHER α-OLEFIN COPOLYMER RUBBER AND CARBON BLACK

BACKGROUND OF THE INVENTION

This invention relates to a novel composition and method for making electrostatically paintable elastomeric polyolefin articles by injection molding techniques for use as, for example, sight shields on the exterior of automotive vehicles.

Recently, use of elastomeric polyolefin polymers for decorative and functional automotive parts has taken on important commercial significance. The consumer, the government, and others are insisting on new industry standards combining safety, durability, performance and aesthetics, all at a minimum cost. Polyolefin elastomeric hydrocarbon copolymers are especially useful for automotive trim application, such as bumper assemblies for automobiles, because they are inexpensive, possess impact-absorbing properties and can be molded into many configurations. Further these elastomers have the ability to recover rapidly to their original state when deformed. However, in order to obtain an economically feasible process and product, it is necessary that the polyolefin composition is readily processable by injection molding and that the composition is electrostatically paintable.

More specifically, for automotive trim use a commercially acceptable elastomeric polyolefin shaped article must be paintable by conventional electrostatic techniques, especially the revolving atomizer process, such as disclosed in U.S. Pat. No. 2,698,814 dated Jan. 4, 1955, to assure economical use of paint and uniform coverage on hard-to-reach surfaces. When utilizing such painting techniques, the article containing carbon black should have a volume resistivity of less than $10^8$ ohm cm., as measured by the 2 by 5 inch method for testing of resistivity, described in Technical Report RG-128, Cabot Corporation, Boston, Mass. Conductivity of sufficient magnitude can be readily imparted to a polymer by compounding it with a sufficient level of carbon black. Some carbon blacks impart greater conductivity on an equal weight basis than others, consequently the amount of carbon black required to achieve a given level of conductivity will vary from one type of carbon black to another. Ease of processing during injection molding will vary with the amount and type of carbon black. In general, increasing the amount of carbon black decreases processing ease. Unfortunately, carbon blacks used heretofore do not impart sufficient conductivity to the polymer composition when used in such an amount as to retain easy processing characteristics, or they fail to yield the desired processing properties when used in the amounts necessary to give the goal conductivity, and others are so expensive as to make such articles commercially unacceptable. Therefore, there is a need in the art for an elastomeric polyolefin copolymer composition that is both readily processable by conventional injection molding techniques, electrostatically paintable, economical, and can be used as, for example, a sight shield placed between the bumper and fender on an automotive vehicle.

SUMMARY OF THE INVENTION

It has now been discovered that large thin parts of elastomeric polyolefin compositions can be easily fabricated by injection molding techniques and the resulting parts are readily paintable by conventional electrostatic methods. Such injection-moldable, electrostatically paintable polyolefin compositions comprise about 100 parts of an ethylene/higher α-olefin copolymer rubber, about 20–100 parts of crystalline propylene polymer, and carbon black, the improvement which comprises said carbon black having a mean particle diameter of from about 15–30 millimicrons, an oil absorption number (A) having a minimum value of about 40 cc/100 g. and a maximum value wherein A is calculated from the formula $A = 0.3116D^2 - 18.708D + 359.67$, wherein D is the mean particle diameter, with the proviso that the maximum value of A is never greater than 130 cc/100 g., said carbon black present within a range determined by the following formulas:

Minimum parts carbon black = $2.157D - 0.0145D^2 - 0.00467AD - 5.03$;

Maximum parts carbon black = $0.863D - 0.0050D^2 - 0.00625AD - 0.3663A + 0.00159A^2 + 49.19$, wherein A and D have the values given hereinabove and parts carbon black is based upon the total weight of polymers.

Polyolefin compositions that are preferred contain carbon black which has an oil absorption number within the range of about 50 to 75, and the amount of carbon black in the polyolefin composition is within the range of 25 to 40 parts based upon total weight of polymer. Such compositions are preferred because they can be most easily processed and electrostatically painted.

DESCRIPTION OF PREFERRED EMBODIMENTS OF THE INVENTION

The injection moldable, electrostatically paintable polyolefin composition is prepared by mixing about 100 parts of an ethylene/higher α-olefin copolymer rubber, about 20–100 parts of crystalline propylene polymer, and a carbon black, specifically defined herein, in an internal mixer. The resulting composition is injection molded and subsequently electrostatically painted by conventional methods.

Selection of a particular carbon black for use in the ethylene/higher α-olefin copolymer composition is necessary for realization of the advantages of the present invention. If the advantages of superior injection molding behavior and a high degree of paintability by electrostatic methods are to be achieved, carbon black selection and the amount to be used must be made on the basis of the particular structure and particle size. The carbon black used has a mean particle diameter of from about 15–30 millimicrons. Particle diameter can be determined by use of an electron microscope. Another physical characteristic of the carbon black used in the present invention is that it has an oil absorption number of at least about 40 cc/100 g. but never greater than 130 cc/100 g., as determined by ASTM Test D 2414 65-T. It is pointed out that when certain values of D are used in the formula to determine the maximum oil absorption number for a suitable carbon black, it is possible that the number calculated will be greater than 130 cc/100 g. However, carbon blacks having oil absorption numbers greater than 130 cc/100 g. are not suitable. In that event, the carbon black used must have an oil absorption number between the range 40–130 cc/100 g. On the other hand, substituting certain values for D in the above formula can result in one calculating an oil absorption number having a maximum value of less than 130 cc/100 g. In that event the carbon black selected for use in this invention can have an oil absorption number within the range of 40 cc/100 g., the minimum, and the calculated value, which is the maximum. Thus, the formula used to determine the oil absorption number does not calculate a required value that must be used, but rather the maximum value of the range of oil absorption numbers suitable for use in this invention.

The minimum parts carbon black used in the composition is determined from the formula $2.157D -0.0145D^2 -0.00467AD -5.03$; the maximum parts carbon black is determined from the formula $0.863D -0.0050D^2 -0.00625AD -0.3663A +0.00159A^2 +49.19$, wherein A and D have the values given hereinabove and parts carbon black is based upon the total weight of polymers in the composition. Any amount of carbon black falling within this range is suitable for use in the present invention.

Carbon blacks having the characteristics described above in relation to particle size and oil absorption number are commercially available from the Cabot Corporation, Boston, Massachusetts, and sold under the tradenames "Regal 660", "Regal 300", "Black Pearl 800", and "Black Pearl 700".

The polyolefin copolymer rubbers suitable for use in this invention are amorphous copolymers of ethylene and a higher alpha-olefin having the formula $R-CH=CH_2$ wherein R is an alkyl radical usually containing up to 8 carbon atoms (EOM). Representative higher α-olefins include propylene, 1-butene, 1-heptene, 1-decene, 1-pentene, 5-methyl-1-hexene and 1-octene; propylene is preferred because the properties of the polymer containing propylene units are superior, and it is readily commercially available. Preferably, the copolymer contains between about 40 and 80 percent by weight ethylene, the balance propylene, (E/P) and optionally containing up to a total of 10% by weight of at least one olefinic hydrocarbon containing at least one polymerizable double bond (EPDM). Among the olefinic hydrocarbons that can be used are the nonconjugated dienes, such as aliphatic dienes, e.g., 1,4-hexadiene, cyclic dienes such as cyclopentadiene and dicyclopentadiene, alkylidene norbornenes such as 5-ethylidene-2-norbornene, alkenyl substituted norbornenes such as 5-methylene-2-norbornene, 5-(2'-ethyl-2-butenyl)-2-norbornene, and 5-(2'-butenyl)-2-norbornene. Also, olefinic hydrocarbons that are nonconjugated dienes containing two reactive double bonds can be used as a fourth component of the polymer. Representative direactive nonconjugated dienes include 1,7-octadiene and norbornadienes. Elastomeric copolymers of the type referred to above are well known in the art and are described more fully in the following: U.S. Pat. Nos. 2,933,480 and 3,819,591.

Any crystalline propylene polymer can be used in the composition of this invention. Preferably the polypropylene is substantially isotactic and the density is equal to or greater than about 0.90, most preferably about 0.905–0.920. The crystalline propylene polymer used can be a homopolymer, a copolymer, or a block polymer containing minor amounts, for example, less than about 10% by weight, of a comonomer of an α-monoolefin such as ethylene, 1-butene, 1-hexene, and the like. The injection moldable, electrostatically paintable polyolefin composition contains about 20–100 parts of crystalline propylene polymer, preferably from about 30 to 80. This amount of propylene polymer imparts to the polyolefin composition the desired elastic recovery properties together with the required stiffness needed for use on the exterior of automotive vehicles. Further, the presence of the propylene polymer improves the processing characteristics of the polyolefin composition so that it can be more easily injection molded to form large thin parts.

The polyolefin composition of this invention containing a carbon black having the structure disclosed and in the amounts specified herein (as contrasted to other polyolefin compositions containing, for example, well known conductive carbon blacks) can be formed into large, thin sheets at relatively low pressures within a short time using conventional injection molding techniques. The polyolefin composition containing the carbon black of the present invention is injection molded with ease. Advantageously a level of electrical resistivity required to permit effective electrostatic painting of the molded article by any conventional process, e.g., especially a revolving atomizer procedure, is reached.

For a clearer understanding of the invention, the following specific examples are given. The examples are intended to be merely illustrative of the invention and are not to be considered limitations thereof.

EXAMPLES 1 THROUGH 4

Parts of ethylene/propylene copolymer rubber, crystalline propylene polymer and carbon black shown in Table I are mixed in an internal mixer until one minute elapses past the time the temperature reaches 350°F. (176°C.). The amount of carbon black is based upon the total weight of polymers. The compound is then dumped, cooled, and granulated to pass through a ¼ inch screen.

Samples of the compounds so prepared are injection molded at a melt temperature of about 410°F. (210°C.) using a 75 ton horizontal reciprocating screw machine. A mold with a single end-gated cavity, said cavity having the shape of a rectangular slab measuring 3 × 5 × 0.75 inches, is used to make test specimens. Each compound is molded at three different injection pressures indicated in Table I. At each injection pressure, the percent of total mold volume filled by the injected compound is measured. The values are reported in Table I to indicate processing characteristics of the compositions; the higher the percentage fill, the greater the ease of injection moldability.

Electrical resistivity of the injection molded specimen is measured using the Cabot 2 × 5 inch method described in Cabot Corporation Technical Report RG-128.

TABLE I

| | Examples | | | |
|---|---|---|---|---|
| | 1 | 2 | 3 | 4 |
| Ethylene Propylene Copolymer Rubber | 60 | 60 | 60 | 60 |

TABLE I-continued

| | Examples | | | |
|---|---|---|---|---|
| Crystalline Polypropylene | 40 | 40 | 40 | 40 |
| Carbon Black 1 | 40 | — | — | — |
| Carbon Black 2 | — | 40 | — | — |
| Carbon Black 3 | — | — | 25 | — |
| Carbon Black 4 | — | — | — | 25 |
| Characteristics of Black | | | | |
| Oil Absorption Number cc/100 g. | 54 | 72 | 65 | 122 |
| Particle Diameter millimicrons | 24 | 27 | 16 | 18 |
| Injection Molding Results | | | | |
| % Fill at Injection Pressure of | | | | |
| 850 lb. gage | 100 | 100 | 100 | 100 |
| 700 lb. gage | 100 | 90 | 100 | 100 |
| Electrical Resistivity | | | | |
| ohm/cm | $7.0\times10^4$ | $1.7\times10^5$ | $1.8\times10^6$ | $1.6\times10^5$ |

As can be seen from above, the samples were injection molded with ease, and had good resistivity for painting. The samples were successfully electrostatically painted by the revolving atomizer technique.

For comparative purposes, the same procedure described above is repeated, except a carbon black outside the scope of the invention is used.

TABLE II

| COMPARATIVE TESTS | | |
|---|---|---|
| | Examples | |
| | 5 | 6 |
| Ethylene Propylene Copolymer Rubber | 60 | 60 |
| Crystalline Polypropylene | 40 | 40 |
| Carbon Black 5 | 40 | — |
| Carbon Black 6 | — | 40 |
| Characteristics of Black | | |
| Oil Absorption Number cc/100 g. | 70 | 120 |
| Particle Diameter millimicrons | 75 | 41 |
| Injection Molding Results | | |
| % Fill at Injection Pressure of | | |
| 850 lb. gage | 95 | 65 |
| 700 lb. gage | 75 | 50 |
| Electrical Resistivity | | |
| ohm/cm | $6.7\times10^8$ | $1.8\times10^5$ |

The flow characteristics of the sample of comparative Example 6 indicates that it is not suitable for making large parts by injection molding; the resistivity of the sample of comparative Example 5 indicates the article cannot be satisfactorily electrostatically painted by the revolving atomizer procedure.

The ethylene/propylene copolymer rubber in Tables I and II is an ethylene/propylene/1,4-hexadiene hydrocarbon rubber. Carbon Black 1 is "Regal 660", Carbon Black 2 is "Regal 300", Carbon Black 3 is "Black Pearl 800", Carbon Black 4 is "Black Pearl 700", Carbon Black 5 is SRF, and Carbon Black 6 is FEF, all available from Cabot Corporation, Boston, Mass.

I claim:

1. In an injection moldable, electrostatically paintable polyolefin composition comprising about 100 parts of an ethylene/higher α-olefin copolymer rubber, about 20–100 parts of crystalline propylene polymer, and carbon black, the improvement which comprises said carbon black having a mean particle diameter of from about 15–30 millimicrons and an oil absorption number (A) having a minimum value of about 40 cc/100 g. and a maximum value wherein A is calculated from the formula:

$$A = 0.3116D^2 - 18.708D + 359.67,$$

wherein D is the mean particle diameter, with the proviso that the maximum value of A is never greater than 130 cc/100 g., said carbon black is present within a range determined by the following formulas:

Minimum parts carbon black = $2.157D - 0.0145D^2 - 0.00467AD - 5.03$;

Maximum parts carbon black = $0.863D - 0.0050D^2 - 0.00625AD - 0.3663A + 0.00159A^2 + 49.19$;

wherein A and D have the values given hereinabove and parts of carbon black is based upon the total weight of polymers.

2. The composition of claim 1 wherein the oil absorption number is within the range of from about 50–75 cc/100 g.

3. The composition of claim 2 wherein the amount of carbon black is within the range of from about 25–40 parts, based upon the total weight of polymers.

4. The composition of claim 3 wherein the α-olefin is propylene.

5. The composition of claim 4 wherein the crystalline propylene polymer contains less than 10% of a comonomer of an α-monoolefin.

6. The composition of claim 4 wherein the ethylene/propylene copolymer rubber contains a nonconjugated diene.

7. The composition of claim 6 wherein the nonconjugated diene is 1,4-hexadiene.

8. The composition of claim 6 wherein the nonconjugated diene is ethylidene norbornene.

9. The composition of claim 6 wherein the nonconjugated diene is dicyclopentadiene.

10. The composition of claim 7 which contains norbornadiene.

11. The composition of claim 6 wherein the propylene polymer is present in an amount of from about 30 to 80.

* * * * *